United States Patent
Chutakanonta et al.

(10) Patent No.: US 12,548,530 B1
(45) Date of Patent: Feb. 10, 2026

(54) LIGHT GUIDE WITH MULTIPLE ILLUMINATION SOURCES

(71) Applicant: Motorola Mobility LLC, Chicago, IL (US)

(72) Inventors: Puckpol Chutakanonta, Chicago, IL (US); Wayne G. Morrison, Lake Zurich, IL (US); Mark D. Finney, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/900,286

(22) Filed: Sep. 27, 2024

(51) Int. Cl.
  *G09G 3/34* (2006.01)
  *G06F 3/16* (2006.01)

(52) U.S. Cl.
  CPC .......... *G09G 3/3473* (2013.01); *G06F 3/165* (2013.01); *G09G 3/3406* (2013.01); *G09G 3/3413* (2013.01); *G09G 2360/144* (2013.01)

(58) Field of Classification Search
  CPC .. G02B 6/0068; G02B 6/0073; G02B 6/0066; G09G 3/3473; G09G 3/3406; G09G 3/3413; G09G 2360/144; G06F 3/165
  See application file for complete search history.

(56) References Cited

U.S. PATENT DOCUMENTS

| | | | | |
|---|---|---|---|---|
| 8,615,151 | B2* | 12/2013 | Rinko | H01H 13/83 362/613 |
| 2010/0302799 | A1* | 12/2010 | Rosberg | H04M 1/22 362/602 |
| 2012/0146925 | A1* | 6/2012 | An | G06F 3/03547 345/173 |

* cited by examiner

*Primary Examiner* — Koosha Sharifi-Tafreshi
(74) *Attorney, Agent, or Firm* — FIG. 1 Patents

(57) ABSTRACT

A computing device includes an illumination controller configured to receive input from one or more sources. The input indicates one or more operating parameters of the computing device. Attributes for light emission are determined from at least two illumination sources of a light guide based on the input. The at least two illumination sources are controlled to illuminate the light guide to indicate the one or more operating parameters via an amount of the light guide that is illuminated. The light guide may be illuminated by blended light including light from each of the illumination sources to indicate an operating parameter that is different relative to operating parameters indicated by light emission from the individual illumination sources.

20 Claims, 8 Drawing Sheets
(3 of 8 Drawing Sheet(s) Filed in Color)

LIGHT GUIDE WITH MULTIPLE ILLUMINATION SOURCES

BACKGROUND

Computing devices such as smartphones are often capable of supporting a variety of different functions. For example, smartphones are often operable to place audio and video calls, communicate text messages, browse the internet, play audio and video media, and so forth. Such devices often include one or more display screens configured to display graphical user interface elements and other features. However, such configurations are not without problems. One such problem is that with the increased functions available to such devices, the graphical user interfaces of the devices can become crowded and/or difficult to navigate. This can cause some features to be difficult to locate within the interfaces, and some features may not be accessible while the interfaces are locked. These problems can lead to user frustration.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the light guide with multiple illumination sources are described with reference to the following drawings. The same numbers are used throughout the drawings to reference like features and components.

DETAILED DESCRIPTION

A light guide with multiple illumination sources is discussed herein. Generally, a computing device (e.g., a smartphone) includes a light guide configured to receive illumination from at least two illumination sources. The light guide is controlled by an illumination controller based on input received by the illumination controller from one or more input sources. The illumination output of the illumination sources is based on the input and is controlled to indicate operation parameters of the computing device. The parameters are indicated by an amount of the light guide that is illuminated. For instance, the light guide may indicate three different operating parameters of the computing device via a portion illuminated by a first illumination source, a portion illuminated by a second illumination source, and a portion illuminated by light blended from both illumination sources.

In contrast to traditional display of operating parameters via graphical user interfaces displayed by display screens, the techniques discussed herein enable operating parameter information to be more quickly accessed and viewed by a user even during conditions in which a display screen of the computing device is powered off. The techniques discussed herein improve the operation of a computing device by increasing the amount of information able to be presented using two illumination sources. In particular, by blending light from the illumination sources to indicate operating parameters in addition to operating parameters indicated with unblended light, the number of operating parameters that can be indicated by the light guide is greater than the number of illumination sources configured to illuminate the light guide. This allows for the light guide to indicate a larger amount of information with fewer illumination sources, thereby reducing a cost of the computing device. Additionally, as the indication of the operating parameters can be observed without powering on the display screen of the computing device, a power consumption of the computing device may be reduced.

Figure 1:
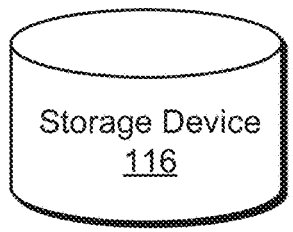
FIG. 1 illustrates an example system including a computing device implementing the techniques discussed herein.

FIG. 1 illustrates an example system 100 including a computing device 102 implementing the techniques discussed herein. The computing device 102 can be, or include, many different types of computing or electronic devices. For example, the computing device 102 can be a smartphone or other wireless phone, a camera (e.g., compact or single-lens reflex), or a tablet or phablet computer. By way of further example, the computing device 102 can be a notebook computer (e.g., netbook or ultrabook), a laptop computer, a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, an automotive computer, and so forth.

The computing device 102 may include a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth. Although the depicted computing device 102 includes the display 104, the microphone 106, and the speaker 108, it should be appreciated that in some implementations the computing device 102 may not include the display 104, the microphone 106, and/or the speaker 108.

The computing device 102 also includes a processing system 110 that includes one or more processors, each of which can include one or more cores. The processing system 110 is coupled with, and may implement functionalities of, any other components or modules of the computing device 102 that are described herein. In one or more embodiments, the processing system 110 includes a single processor having a single core. Alternatively, the processing system 110 includes a single processor having multiple cores or multiple processors (each having one or more cores).

The computing device 102 also includes an operating system 112. The operating system 112 manages hardware, software, and firmware resources in the computing device 102. The operating system 112 manages one or more applications, such as application 114, running on the computing device 102, and operates as an interface between applications such as application 114 and hardware components of the computing device 102.

The computing device 102 also includes a storage device 116. The storage device 116 can be implemented using any of a variety of storage technologies, such as magnetic disk, optical disc, Flash or other solid state memory, and so forth. The storage device 116 can store various program instructions and data for any one or more of the operating system 112, application 114, and an illumination system 118 (described further below).

The computing device 102 also includes a communication system 120. The communication system 120 manages communication with various other devices, including establishing voice calls with other devices, sending electronic communications to and receiving electronic communications from other devices, and so forth. The content of these electronic communications and the recipients of these electronic communications is managed by an application such as application 114 or the operating system 112. This management of the content and recipients can include displaying received electronic communications, providing a user interface to compose a new electronic communication or reply to a received electronic communication, select recipients for an electronic communication, display natural language responses, and so forth.

The devices can be any of a variety of types of devices, analogous to the discussion above regarding the computing device 102. This communication can take various forms, such as voice calls (e.g., over a cellular system, public switched telephone network (PSTN), network (e.g., using voice over Internet Protocol (VOIP), etc.), short messaging service (SMS) messages, multimedia messaging service (MMS) messages, email, group based chat messaging system, and so forth. This communication can be carried out over a network, which can be any of a variety of different networks, including the Internet, a local area network (LAN), a public telephone network, a cellular network (e.g., a third generation (3G) network, a fourth generation (4G) network, a fifth generation (5G) network), an intranet, other public or proprietary networks, combinations thereof, and so forth. The computing device 102 can thus communicate with other devices wirelessly and accordingly is also referred to as a wireless device.

The computing device 102 also includes a fingerprint sensor 122. The fingerprint sensor 122 is configured to detect the fingerprint of the current user of the computing device 102 (e.g., while the user presses a finger against the fingerprint sensor 122). The operating system 112 may verify whether the current user of the computing device 102 is authorized to access a graphical user interface (GUI), media, contacts, and/or other elements or data implemented by the operating system 112 and/or stored via the storage device 116 based on the sensed fingerprint. For example, the operating system 112 may compare the sensed fingerprint to fingerprint data stored in the storage device 116 to determine whether the sensed fingerprint belongs to a user authorized to access the GUI, etc. If the sensed fingerprint matches the fingerprint data, the operating system 112 may provide the user with access to the GUI and/or other features. However, if the sensed fingerprint does not match the fingerprint data, the operating system 112 may deny the user access to the GUI and/or other features.

The computing device 102 further includes an illumination system 118 in accordance with the techniques described herein. The illumination system 118 includes an illumination controller 124 and illumination sources 126. The illumination controller 124 is employed by the computing device 102 to control illumination of a light guide 128 via the illumination sources 126. The illumination controller 124 is configured to be in electronic communication with various components of the computing device 102, such as the processing system 110, operating system 112, microphone 106, communication system 120, etc. The illumination sources 126 are in electronic communication with the illumination controller 124 and receive instructions (e.g., commands) from the illumination controller 124. For example, the illumination controller 124 may control an amount of electrical current, electrical voltage, etc. provided to the illumination sources 126 in order to control one or both an intensity of light or a color of light emitted by the illumination sources 126. In some implementations, the illumination sources 126 are light-emitting diodes (LEDs) arranged within a housing 130 of the computing device 102 and controllable by the illumination controller 124 to emit various colors and intensities of light. For example, each of the illumination sources may be multicolor LEDs capable of emitting light of various different colors (e.g., red, blue, green, purple, yellow, white, etc.).

The light guide 128 is separate from the display 104 and is employed by the computing device 102 to illuminate to represent various conditions, events, and/or parameters associated with the computing device 102 as described further below. For example, the light guide 128 may illuminate responsive to establishing an electronic connection between the computing device 102 and one or more networks, with a color and/or intensity of the illumination representing a strength of the connection (e.g., wired or wireless signal strength). The light guide 128 is configured to blend light emitted by two or more of the illumination sources 126 in some situations, with the blended light and non-blended light representing different conditions, events, or parameters.

In this way, the illumination controller 124 controls illumination of the light guide 128 to display various indications of a status of the computing device 102 that can be easily understood at-a-glance by a user without powering on the display 104 or navigating menus of the operating system 112. This may reduce a power consumption of the computing device 102 while increasing information regarding the status of the computing device 102 available to the user without displaying the information via the display 104.

Additionally, by indicating the status of the computing device 102 via the light guide 128, graphical user interfaces employed by the operating system 112, applications such as application 114, etc. may be simplified and less crowded when displayed on the display 104. In particular, because the light guide 128 is operable to indicate the status of the computing device 102 separately from the display 104, the status information can be omitted from the graphic user interfaces, thereby increasing an amount of the display 104 available to display other information and/or enabling the display 104 to be configured with a lower resolution to reduce a power consumption and cost of the computing device 102.

The computing device 102 need not include all of the components illustrated in FIG. 1. In particular, because the light guide 128 indicates the status of the computing device 102, in some implementations the computing device 102 may be configured without the display 104. For example, the computing device 102 may be a case (e.g., a housing) that stores a pair of ear buds. In this example, the computing device 102 need not include various components illustrated in FIG. 1, such as the display 104, the microphone 106 (as a microphone would be included in the ear buds), the fingerprint sensor 122, and so forth.

Figure 2:
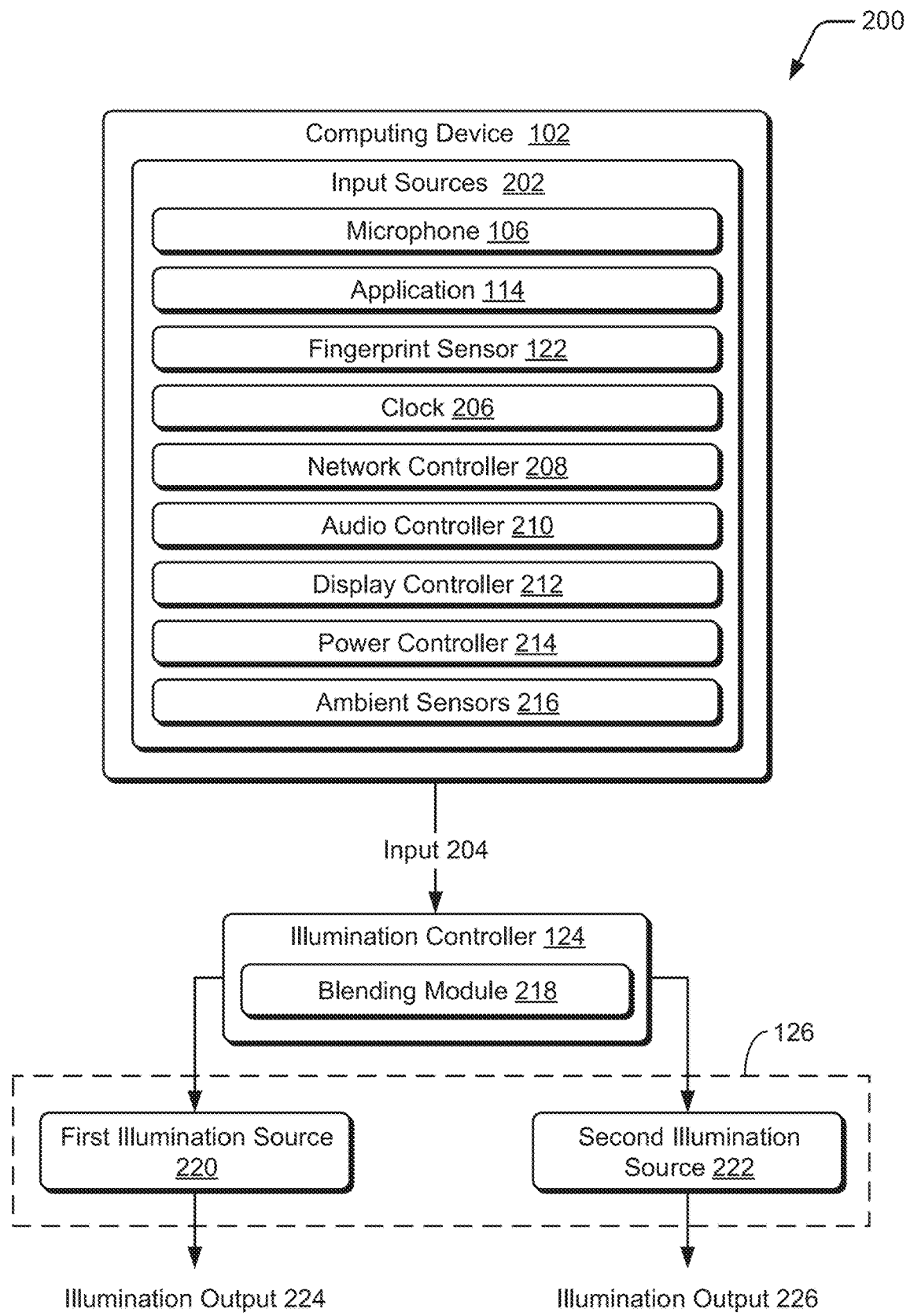
FIG. 2 illustrates an example system implementing the techniques discussed herein.

FIG. 2 illustrates an example system 200 implementing the techniques discussed herein. In the depicted example, the computing device 102 includes various input sources 202 that are operable to provide input 204 to the illumination controller 124, with the illumination controller 124 configured to control the light emission output of the illumination sources 126 based on the input 204. Although the input 204 is depicted as received by the illumination controller 124, in some instances the input 204 may also be received by one or more processors of the processing system 110. Further, although the illumination controller 124 is depicted as separate from the processing system 110, in some implementations the illumination controller 124 may be integrated with the processing system 110 in software or hardware (e.g., integrated with one or more processors of the processing system 110).

The input sources 202 depicted by FIG. 2 are non-limiting examples of input sources that may provide input to the illumination controller 124. In other examples, the input sources 202 may include additional input sources or fewer input sources than those depicted by FIG. 2. In some instances, the input 204 may be received by the illumination controller 124 from a single input source of the input sources 202. In other instances, the input 204 may be received from two or more of the input sources 202.

The input sources 202 include components of the computing device 102 implemented in hardware or software that communicate electronically with the illumination controller 124 (e.g., share data with the illumination controller 124). The electronic communication may include wired and/or wireless communication between the input sources 202 (and/or components implementing the input sources 202) and the illumination controller 124. Such electronic communication may include transmission of signals (e.g., electronic signals) to the illumination controller 124 via a wired or wireless connection.

In some examples, the input 204 may be provided from one or more of the input sources 202 to the illumination controller 124 automatically (e.g., at periodic intervals, responsive to one or more conditions, etc.). In other examples, the illumination controller 124 may detect whether one or more conditions have occurred (e.g., whether a user has touched the fingerprint sensor 122, whether the microphone 106 has been activated, etc.). Responsive to confirming that the one or more conditions have occurred, the illumination controller 124 may communicate electronically with the input sources 202 (e.g., the fingerprint sensor 122 and/or microphone 106 in this example) to acquire the input 204.

The input 204 communicated to the illumination controller 124 may vary based on the source of the input 204. For example, input provided to the illumination controller 124 from the clock 206 may be different than input provided to the illumination controller 124 from the network controller 208. Various examples of input 204 that may be provided to the illumination controller 124 from the input sources 202 are described below. However, it should be appreciated that the examples are non-limiting and in other examples, different input from the input sources 202 may be provided to the illumination controller 124.

The clock 206 may be implemented in hardware and/or software of the computing device 102 and may maintain a current time stored in a memory of the computing device 102. The current time may be in accordance with Coordinated Universal Time (UTC), as one example. In some examples, the clock maintains the current date in the memory of the computing device 102, including the year, month, and day. The clock 206 may communicate data including the current year, month, week, day, and time to the illumination controller 124 as input 204. The current time may be expressed (e.g., formatted) as data including the current hour, minute, and second. In some examples, the clock 206 may additionally or alternatively be employed to implement one or more timers (e.g., measuring a duration following a particular event, such as user-initiated timer activation), stopwatches (e.g., countdowns), and/or alarms (e.g., scheduled alerts) and data describing these features may be communicated to the illumination controller 124 as input 204.

The network controller 208 included by the computing device 102 is configured to manage connections between the computing device 102 and one or more networks. For example, the network controller 208 may be employed to connect the computing device 102 to the internet, one or more LANs, cellular networks, and so forth. Input 204 communicated to the illumination controller 124 from the network controller 208 may include an indication of whether the computing device 102 is connected to a network, an indication of available networks, and/or an indication of wired or wireless signal strength between the computing device 102 and one or more connected networks.

The audio controller 210 included by the computing device 102 is configured to control audio output of the computing device 102. For example, the audio controller 210 may control a playback volume of media such as music, voicemails, alarms, sound effects, etc. Input 204 communicated to the illumination controller 124 from the audio controller 210 may include an indication of the volume level output to the speaker 108 or other device (e.g., headphones). The input 204 may additionally or alternatively include data describing waveforms of the audio output.

The microphone 106 receives (e.g., detects, measures, etc.) ambient sounds (e.g., speech and/or other noise), and the input 204 communicated to the illumination controller 124 from the microphone 106 may include an indication and/or waveform of the received sounds. In some examples, the microphone 106 may communicate with the illumination controller 124 by way of the audio controller 210.

The display controller 212 controls an appearance of content displayed on the display 104. Input 204 provided to the illumination controller 124 by the display controller 212 may include an indication of a type of content displayed by the display 104 (e.g., content such as games, media, internet browsers, graphical user interface elements, etc.). In some examples, the input 204 additionally or alternatively includes data describing display parameters of the display 104 such as display brightness, contrast, color cast, etc.

The power controller 214 manages electrical power available to the computing device 102. For example, the power controller 214 may monitor an amount of charge remaining in a battery of the computing device 102. The power controller 214 may additionally monitor charging of the battery during conditions in which the computing device 102 is connected to a power source such as an electrical wall outlet via a wired connection. The input 204 communicated to the illumination controller 124 from the power controller 214 may include an indication of a current battery charge (e.g., expressed as a percentage of a maximum or full amount of charge), an indication of whether the computing device 102 is connected to another power source (e.g., a stationary power source such as an electrical wall outlet, a mobile power source such as an auxiliary battery, etc.), or other data relating to power available to the computing device 102.

The ambient sensors 216 of the computing device 102 include sensors configured to detect ambient conditions around the computing device 102. For example, the ambient sensors 216 may include light sensors, gyroscopic sensors, accelerometers, magnetometers, temperature sensors, humidity sensors, etc. Input 204 provided to the illumination controller 124 by the ambient sensors 216 may include an indication (e.g., measurement) of an amount of ambient light around the computing device 102, an indication of ambient temperature, an indication of ambient humidity, an indication of an orientation of the computing device 102 (e.g., from one or more gyroscopic sensors and/or accelerometers), etc.

The fingerprint sensor 122 is configured to detect the fingerprint of a user of the computing device 102 during conditions in which the user presses a finger against the fingerprint sensor 122. The fingerprint sensor 122 may image (or otherwise scan) the fingerprint of the user to compare the fingerprint to fingerprint data as described above. Input 204 communicated from the fingerprint sensor 122 to the illumination controller 124 may include an indication of whether the fingerprint sensor 122 detects engagement of a finger of the user against the fingerprint sensor 122, an indication of whether the detected fingerprint matches the fingerprint data, etc.

The applications such as application 114 are implemented in software in the computing device 102 and may include, for example, internet browsers, media players, games, social media applications, messaging applications, utilities such as flashlight applications, etc. The input 204 provided to the illumination controller 124 by the applications may include an indication of a number of applications currently open on the computing device 102, a type of each application, a content of each application, etc.

The illumination controller 124 receives the input 204 and processes the input 204 to determine illumination parameters for the light guide 128 based on the input. Determining the illumination parameters may include, for example, determining a color (e.g., wavelength) and intensity (e.g., luminance) of light to be emitted from the illumination sources 126. Determining the illumination parameters may further include determining an amount of blending and location of blending of light from the illumination sources 126 via a blending module 218. The blending module 218 may be implemented in hardware (e.g., integrated with the illumination controller 124 as an integrated circuit) or software (e.g., as executable instructions stored in a memory of the illumination controller 124).

The illumination controller 124 communicates electronically with the illumination sources 126 to control operation of the illumination sources 126 according to the illumination parameters. For example, the illumination controller 124 may control a first illumination source 220 and a second illumination source 222 of the illumination sources 126 separately, such that a color and/or intensity of light emitted by the first illumination source 220 differs from a color and/or intensity of light emitted by the second illumination source 222.

The illumination parameters such as the color of light, intensity of light, amount of blending, and location of blending are based on the input 204 and may be different according to which input sources 202 provide the input 204. For example, the color or intensity of light emitted by the illumination sources 126 may be selected by the illumination controller 124 to indicate different parameters or conditions. As one example, the illumination controller 124 may receive input 204 from clock 206 indicating the current time, and the illumination controller 124 may visually represent the current time using light emitted by the first illumination source 220 and the second illumination source 222 as well as an amount of blending of the light from each illumination source. In particular, an illumination output 224 of the first illumination source 220 may have a first color or intensity representing a current hour of the current time, an illumination output 226 of the second illumination source 222 may have a second color or intensity representing a current minute of the current time, and an amount of blending of the illumination output 224 and the illumination output 226 in the light guide 128 may represent an amount of time (e.g., minutes) remaining until an hour subsequent to the current hour occurs. Various other non-limiting examples are described further below.

Figure 3:
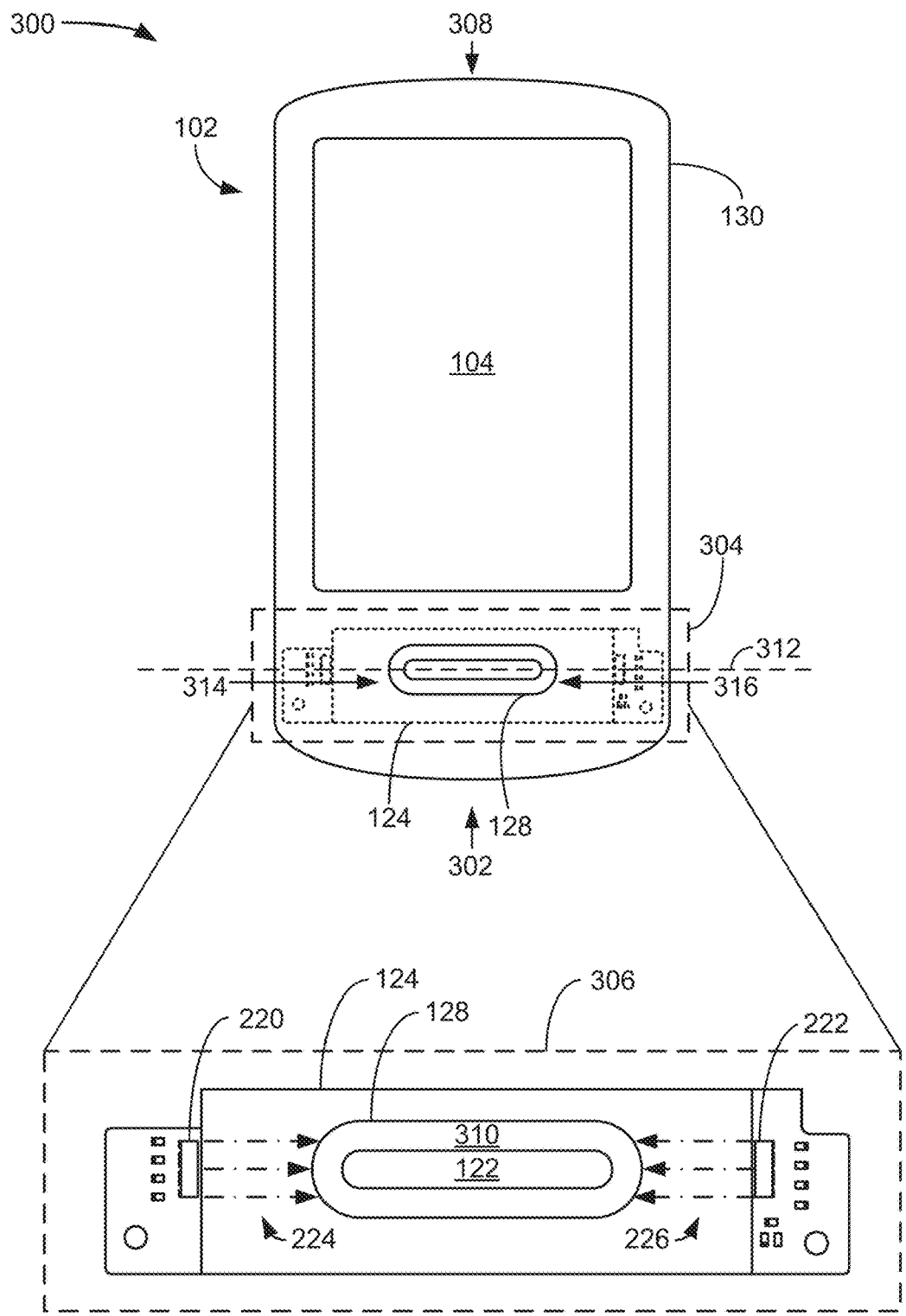
FIG. 3 illustrates an example computing device implementing the techniques discussed herein.

FIG. 3 illustrates an example system 300 including an example configuration of the computing device 102 including the illumination controller 124. In the example shown, the illumination controller 124 is implemented in hardware as a printed circuit board (PCB) that may include one or more integrated circuits (ICs). The shorter broken lines in the figure indicate portions of the illumination controller 124 that are arranged within the housing 130 of the computing device 102. In the example shown, the illumination controller 124 is arranged toward a lower end 302 of the housing 130 (e.g., spaced apart from the display 104 of the computing device 102). A portion 304 of the computing device 102 including the illumination controller 124 is also shown in an enlargement 306. In other implementations, the illumination controller 124 may be located at a different position (e.g., toward an upper end 308 of the housing 130).

The light guide 128 is arranged at least partially exterior to the housing 130 (e.g., the light guide is visible from the exterior of the housing 130). For example, a portion of the light guide 128 may be arranged within the housing 130, while another portion of the light guide 128 protrudes outward from the housing 130 and is visible at the exterior of the housing 130.

In various implementations, the light guide 128 is formed at least in part by a light guide film (LGF). For example, an LGF 310 is configured to receive light from at least one illumination source (e.g., first illumination source 220 and/or second illumination source 222) and spread the received light through the light guide 128. To do so, the LGF 310 may be a transparent or translucent material that includes recesses, protrusions, and/or printed textures that direct light through the light guide 128. The LGF 310 may be configured in a variety of ways without departing from the scope of this disclosure. The LGF 310 and the illumination sources are arranged such that during conditions in which the illumination sources emit light, the emitted light is incident to the LGF 310 and the LGF 310 distributes the incident light through the light guide 128.

In the implementation shown, light enters the LGF 310 from the illumination sources in a direction parallel with the axis 312, and the light is dispersed (e.g., scattered) by the LGF 310 in directions away from the computing device 102 (e.g., perpendicular to the axis 312 and toward the plane of view in FIG. 3). Although the light is depicted as entering the LGF 310 in the direction parallel with the axis 312, it should be appreciated that in some instances the light may enter the LGF 310 from a different direction (e.g., a direction at a non-zero angle relative to the axis 312). The first illumination source 220 and the second illumination source 222 form a pair of illumination sources that are arranged along the axis 312 and opposite to each other across the light guide 128. In particular, the first illumination source 220 is arranged at a first end 314 of the light guide 128 and the second illumination source 222 is arranged at a second end 316 of the light guide 128, with the first end 314 opposite to the second end 316 along the axis 312. In this arrangement, the first illumination source 220 emits light (e.g., illumination output 224) spreading from the first end 314 of the light guide 128 toward the second end 316, and the second illumination source 222 emits light (e.g., illumination output 226) spreading from the second end 316 of the light guide 128 toward the first end 314. The light emitted by the first illumination source 220 spreads through the light guide 128 toward the second illumination source 222, and the light emitted by the second illumination source 222 spreads through the light guide 128 toward the first illumination source 220.

The light guide 128 is further shown encircling the fingerprint sensor 122. In particular, in the implementation shown, the light guide 128 has an elongated oval shape, and the fingerprint sensor 122 is arranged at a portion of the housing 130 surrounded by the light guide 128. Although the fingerprint sensor 122 is depicted as surrounded by the light guide 128, in other implementations the light guide 128 may surround a different component or have a shape that does not encircle another component.

The light guide 128 has a length in the direction between the first illumination source 220 and the second illumination source 222 (e.g., along axis 312) that is larger than a width in a direction between the lower end 302 and the upper end 308 of the housing 130 (e.g., the direction perpendicular to the axis 312). The increased length of the light guide 128 relative to the width of the light guide 128 provides a larger variety of ways in which the light guide 128 may be illuminated. For example, the light emitted by the first illumination source 220 and/or the second illumination source 222 may be controlled by the illumination controller 124 such that the light does not span (e.g., spread) through an entirety of the light guide 128. As one example, the first illumination source 220 may be controlled by the illumination controller 124 to illuminate a portion of the light guide 128 at the first end 314 without the emitted light illuminating portions of the light guide 128 at the second end 316. However, in other implementations, the light guide 128 may have a different shape, such as an oval shape without a central opening (e.g., a filled oval shape), a rectangular shape, an open-ended curved shape (e.g., a C-shape), etc.

In various implementations, the light emitted by the illumination sources may be collimated light. For example, first illumination source 220 may include one or more filters configured to permit light to enter the light guide 128 in a direction parallel with the axis 312 while concurrently blocking light that is not parallel with the axis 312 from reaching the light guide 128. Collimating the light in this way may increase an ease of controlling the spread of the light through the light guide 128.

Each of the illumination sources may be controlled independent of each other via the illumination controller 124. The illumination controller 124 may control attributes of light emitted by the first illumination source 220 and the second illumination source 222 such as light intensity, light wavelength (e.g., color), etc. As one example, the first illumination source 220 may be controlled to emit light at a first intensity and the second illumination source 222 may be controlled to emit light at a second intensity, with the first intensity and the second intensity being different amounts of intensity (e.g., different lumen outputs). As another example, the first illumination source 220 may be controlled to emit light having a first wavelength (e.g., seven hundred nanometers, resulting in light having a red color) and the second illumination source 222 may be controlled to emit light having a second wavelength (e.g., five hundred nanometers, resulting in light having a blue color). Further, combinations of different intensities and different colors are possible (e.g., first illumination source 220 emitting light with a first intensity and first color, and second illumination source 222 emitting light with a second intensity and second color).

Figure 4:
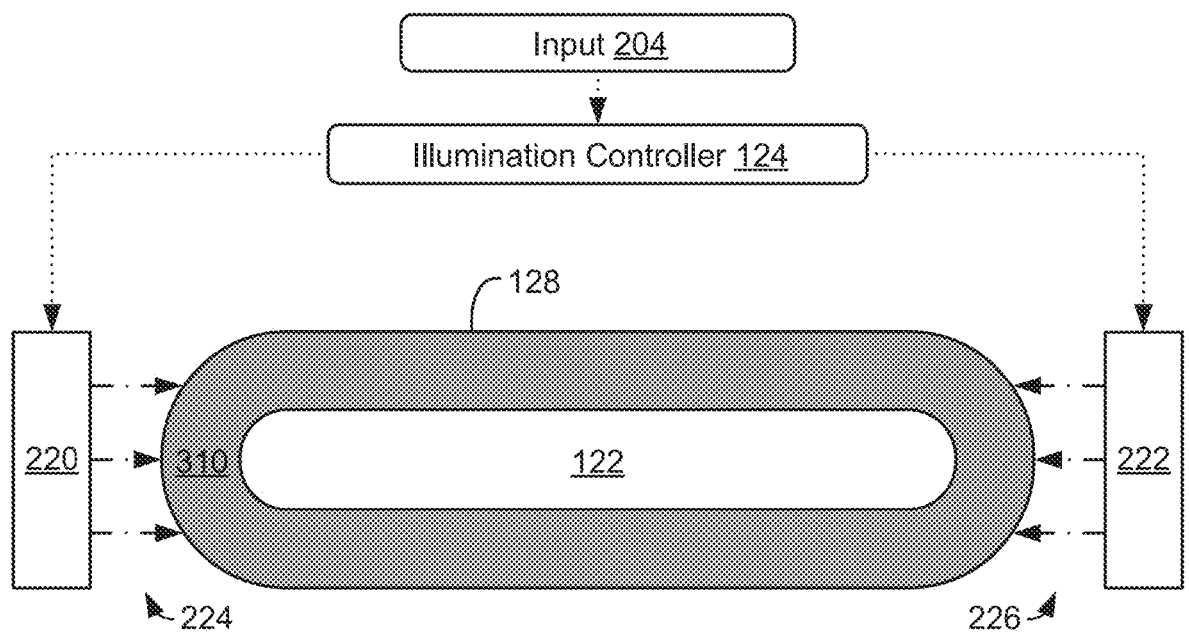
FIG. 4 illustrates a light guide illuminated with unvaried light emission from illumination sources in accordance with the techniques discussed herein.

FIG. 4 depicts an example illumination of the light guide 128. In this example, the light guide 128 is illuminated by each of the first illumination source 220 and the second illumination source 222. The illumination controller 124 controls attributes for light emission from the first illumination source 220 and the second illumination source 222 such that the first illumination source 220 and the second illumination source 222 each emit light with a same intensity (e.g., luminance) and a same wavelength (e.g., color). Although the light is depicted as having a green color in the example, it should be appreciated that the color may be different (e.g., blue, red, yellow, purple, etc.) without departing from the scope of this disclosure.

The illumination controller 124 sets the attributes for light emission from the illumination sources based on input 204 received from one or more of the input sources 202 as described above. In some implementations, the illumination of the light guide 128 depicted by FIG. 4 may be part of a sequence of illumination of the light guide 128 controlled by the illumination controller 124 based on the input 204. For example, a sequence of illumination of the light guide 128 may include a first stage having the illumination depicted by FIG. 4, and a second stage in which the light guide 128 is illuminated with light having the same intensity but a different color. The illumination shown by FIG. 4 in which the first illumination source 220 and the second illumination source 222 are each controlled by the illumination controller 124 to emit light having a same color and intensity may be referred to herein as a uniform or unblended illumination of the light guide 128.

The light guide 128 may be illuminated as depicted by FIG. 4 in various different scenarios. For example, the depicted illumination may occur responsive to receiving input 204 from the power controller 214 specifying that the battery of the computing device 102 is fully charged or fully depleted. As another example, the depicted illumination may occur responsive to receiving input 204 from the microphone 106 and/or audio controller 210 that audio recording is activated (e.g., the computing device 102 is receiving ambient audio input via the microphone 106 and recording the audio to memory). As yet another example, the depicted illumination may occur responsive to receiving input 204 from the display controller 212 and/or the audio controller 210 specifying that video or audio playback is being performed by the computing device 102. As yet another example, the depicted illumination may occur responsive to receiving input 204 from an application, such as application 114, that controls a flashlight function of the 102 (e.g., illuminates an image detector flash light source of the computing device 102). The input 204 may specify that the flashlight function is active (e.g., turned on). As yet another example, the depicted illumination may occur responsive to receiving input 204 from the fingerprint sensor 122 that a fingerprint of a user is currently being acquired or that the fingerprint has been verified or rejected (e.g., matches the fingerprint data or does not match the fingerprint data, respectively). As yet another example, the depicted illumination may occur responsive to receiving input 204 from the 205 that the computing device 102 is currently connected or disconnected from a network, such as a cellular network, local area network, etc. Other examples are possible.

Figure 5:
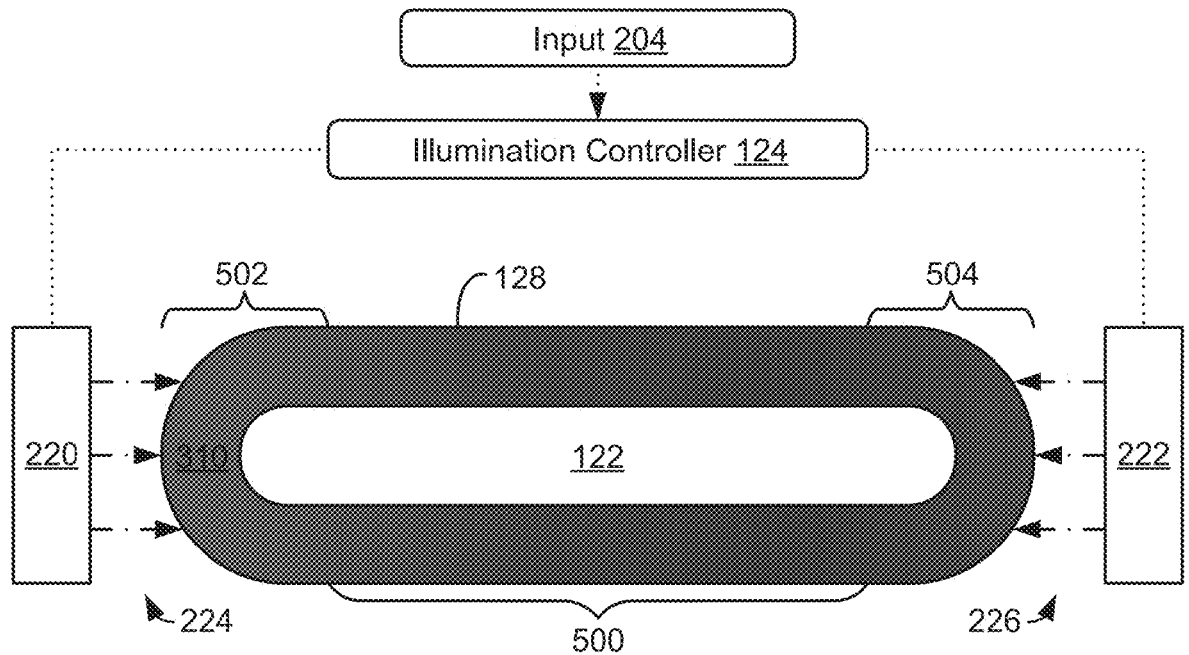
FIG. 5 illustrates a light guide illuminated with blended light emission from illumination sources in accordance with the techniques discussed herein.

FIG. 5 depicts another example illumination of the light guide 128. In the depicted example, the illumination controller 124 sets light emission attributes (e.g., illumination parameters) for the first illumination source 220 and the second illumination source 222 based on the received input 204. The light emission attributes in this example specify that the illumination output 224 of the first illumination source 220 is different from the illumination output 226 of the second illumination source 222. In particular, in this example, the first illumination source 220 and the second illumination source 222 each output illumination having different wavelengths (e.g., colors). The illumination output 224 of the first illumination source 220 may also have a different intensity than the illumination output 226 of the second illumination source 222.

In the example, the illumination output 224 of the first illumination source 220 has a red color, and the illumination output 226 of the second illumination source 222 has a blue color. However, the colors shown are non-limiting examples, and in other instances the colors may be different. For instance, the illumination output 224 may have a yellow color, and the illumination output 226 may have a purple color. Other examples are possible.

The illumination output 224 of the first illumination source 220 mixes and converges (e.g., blends) with the illumination output 226 of the second illumination source 222. In particular, the illumination output 224 having the red color blends with the illumination output 226 having the blue color to result in a portion 500 of the light guide 128 that is illuminated with the blended light having a purple color. The blended light with the purple color is not emitted directly from either of the first illumination source 220 or the second illumination source 222 and instead results from the combined light emission of both of the first illumination source 220 and the second illumination source 222.

According to the techniques described herein, the blended light may be employed by the computing device 102 to illuminate the light guide 128 to indicate at least one operating parameter of the computing device 102. The illumination controller 124 may control the intensity and/or color of the illumination output of the first illumination source 220 and/or the second illumination source 222 to adjust a size of the portion of the light guide 128 illuminated with the blended light (e.g., select the portion of the light guide 128 at which the blending of the illumination output from both illumination sources occurs). Further, a portion 502 of the illumination output 224 that is not blended with the illumination output 226 may illuminate the light guide 128 to indicate another operating parameter of the computing device 102, and a portion 504 of the illumination output 226 that is not blended with the illumination output 224 may illuminate the light guide 128 to indicate yet another operating parameter.

As one example, the illumination controller 124 may receive input 204 from the network controller 208 specifying that the computing device 102 is connected to a local area network (LAN), the internet, and a personal area network (PAN). Responsive to the input 204, the illumination controller 124 controls the first illumination source 220 to generate illumination output 224, with the portion 502 indicating the connection of the computing device 102 to the LAN. The illumination controller 124 further controls the second illumination source 222 to generate illumination output 226, with the portion 504 indicating the connection of the computing device 102 to the PAN. The illumination controller 124 further controls the first illumination source 220 and the second illumination source 222 to control the size of the portion 500 in which the illumination output 224 and the illumination output 226 blend together. The portion 500 indicates the connection of the computing device 102 to the internet via the color and/or intensity of the blended light.

In the above example, a strength of the connection of the computing device 102 to the LAN may be indicated by a size of the portion 502, a strength of the connection of the computing device 102 to the PAN may be indicated by a size of the portion 504, and a strength of the connection of the computing device 102 may be indicated by a size of the portion 500. The illumination controller 124 thus indicates the various connections based on the color and/or intensity of the light illuminating the light guide 128, and the amount of the light guide 128 that is illuminated by the illumination sources. In particular, the amount of the light guide 128 illuminated by the first illumination source 220 without blending of the illumination output 224 with the illumination output 226 indicates a first operating parameter (e.g., the connection of the computing device 102 to the LAN). The amount of the light guide 128 illuminated by the second illumination source 222 without blending of the illumination output 226 with the illumination output 224 indicates a second operating parameter (e.g., the connection of the computing device 102 to the PAN). The amount of the light guide 128 illuminated by the first illumination source 220 and the second illumination source 222 via the blending of the illumination output 224 with the illumination output 226 indicates a third operating parameter (e.g., the connection of the computing device 102 to the internet).

During conditions in which the connection strength of one or more of the above connections changes, the input 204 communicated to the illumination controller 124 by the network controller 208 is updated to indicate the updated connection strengths. The illumination controller 124 accordingly updates the illumination output 224 and/or the illumination output 226 to adjust the amount of the light guide 128 illuminated by one or both of the illumination sources to indicate the updated connection strengths. In this way, the light guide 128 is able to indicate the three operating parameters of the computing device 102 with the two illumination sources, which reduces a cost and complexity of the illumination controller 124 compared to illuminating the light guide 128 with additional illumination sources. Further, as the light guide 128 is separate from the display 104, the light guide 128 provides an immediate indication of the operating parameters at-a-glance without navigation through graphical user interface features or menus. This increases an ease of use of the computing device 102 and may reduce power consumption associated operation of the display 104 by reducing a duration and/or frequency of powering the display 104.

Although the network connections are described above as example operating parameters that can be indicated via the illumination of the light guide 128, other examples are possible. In particular, the light guide 128 may be employed to indicate operating parameters corresponding to the various types of input 204 described above with reference to FIG. 2.

As one example, consider a scenario in which the input 204 is received by the illumination controller 124 from the clock 206. In this scenario, the portion 502 of the illumination output 224 may indicate a current hour of the current time, the portion 504 of the illumination output 226 may indicate a current minute of the current time, and the portion 500 including the blended light from the illumination output 224 and the illumination output 226 may indicate an amount of minutes remaining until a next hour subsequent to the current hour.

As another example, consider a scenario in which the input 204 is received by the illumination controller 124 from the power controller 214. In this scenario, the portion 502 of the illumination output 224 may indicate an amount of battery charge at which the processing system 110 operates with increased computational speed or efficiency (or a maximum amount of charge), the portion 504 of the illumination output 226 may indicate an amount of remaining charge of the battery (e.g., indicated as a percentage of the maximum according to a size of the portion 504), and the portion 500 including the blended light from the illumination output 224 and the illumination output 226 may indicate an amount of battery charge depleted. Other examples are possible.

As another example, consider a scenario in which the input 204 is received by the illumination controller 124 from the microphone 106. In this scenario, the illumination output 224 and the illumination output 226 may be controlled by the illumination controller 124 to indicate a level and/or waveform of audio (e.g., ambient sounds) received by the microphone 106. For example, the different portions of the illumination output described above may be employed to provide a visual indication of acoustic waves associated with sounds such as a breathing or speech of the user. As one example, the size and/or position of the blended light at portion 500 of the light guide 128 may be adjusted based on the input 204 to indicate an amount of compression or rarefaction of longitudinal waves propagating through air that are measured by the microphone 106. The size and/or position of the blended light at portion 500 of the light guide 128 may be adjusted over time, providing an appearance of the light output by the LGF 310 being in motion.

As another example, consider a scenario in which the input 204 is received by the illumination controller 124 from the application 114. In this scenario, the illumination output 224 and the illumination output 226 may be controlled by the illumination controller 124 to indicate how soon something may occur or that something related to the application 114 will occur soon. For example, the application 114 may set a timer and the intensity of the illumination output 224 and/or the illumination output 226 may fluctuate between a high intensity (e.g., 80% of a maximum intensity) and a low intensity (e.g., 20% of a maximum intensity) at a rate dependent on the amount of time remaining on the timer. As one example, if the timer is set to 30 minutes, the illumination output 224 and/or the illumination output 226 may begin to fluctuate between a high intensity and a low intensity slowly (e.g., changing intensity levels every 20 seconds when there is 15 minutes remaining on the timer) and then gradually increase as less time remains on the timer (e.g., changing intensity levels every 10 seconds when there is 10 minutes remaining on the timer, changing intensity levels every 5 seconds when there is 3 minutes remaining on the timer, and changing intensity levels every 2 seconds when there is 30 seconds remaining on the timer).

As another example, consider a scenario in which the input 204 is received by the illumination controller 124 from an accelerometer and/or gyroscope included by the ambient sensors 216. In this scenario, the illumination output 224 and the illumination output 226 may be controlled by the illumination controller 124 to indicate an amount of tilting, rotation, and/or movement of the computing device 102. As one example, the position of the blended light at portion 500 of the light guide 128 may be adjusted based on the input 204 by biasing the portion 500 toward the first illumination source 220 while the computing device 102 is tilted in a first direction and by biasing the portion 500 toward the second illumination source 222 while the computing device 102 is tilted in an opposite, second direction. Other examples are possible.

As described above, while illuminated by the illumination sources, the light guide 128 directs light received from the illumination sources in a direction away from the computing device 102 via the LGF 310 (e.g., toward the plane of view in FIG. 5). An intensity of the light directed away from the computing device 102 by the light guide 128 is based on the intensity of the illumination output of the illumination sources.

In some conditions, such as conditions in which ambient light levels are high, the illumination controller 124 may adjust the illumination output of the illumination sources to increase the intensity of the light emitted by the light guide 128. The increased intensity of the light emitted by the light guide 128 may increase a visibility of the illumination of the light guide 128 (e.g., increase a visibility of the blended light at portion 500). For example, the intensity may be increased such that the light guide 128 emits light at an intensity that is greater than an intensity of the ambient light. As one non-limiting example, the ambient light may be measured by the ambient sensors 216 has having an illuminance level of one-thousand lux, and the intensity of the illumination of the light guide 128 may be increased to have an illuminance level of two-thousand lux.

The illumination controller 124 may control the illumination of the light guide 128 based on the ambient light conditions by comparing the measured ambient light level to a pre-determined ambient light level stored in memory (e.g., a memory of the computing device 102 accessible by the illumination controller 124). The pre-determined ambient light level may be associated with a pre-determined intensity of illumination of the light guide 128. The pre-determined ambient light level and the pre-determined intensity of illumination of the light guide 128 may be referred to as a normalized ambient light level and a normalized illumination intensity, respectively.

During conditions in which the measured ambient light level is greater than the normalized ambient light level, the illumination intensity of the light guide 128 may be accordingly increased to be greater than the normalized illumination intensity. During conditions in which the measured ambient light level is less than the normalized light level, the illumination intensity of the light guide 128 may be accordingly decreased to be less than the normalized illumination intensity. In this way, in various different ambient lighting conditions, the appearance of the illumination of the light guide 128 may be consistent (e.g., a difference or relationship between the intensity of the ambient light and the intensity of the illumination of the light guide may be maintained). In some implementations, the illumination controller 124 may determine the illumination intensity of the light guide 128 using one or more lookup tables stored in memory of the computing device 102, with the one or more lookup tables specifying various illumination intensities for different ambient light levels. In some implementations, the illumination controller 124 may determine the illumination intensity of the light guide 128 using a function or algorithm stored in memory, with an input of the function or algorithm being the measured ambient light level and an output being the illumination intensity of the light guide 128.

Figure 6:
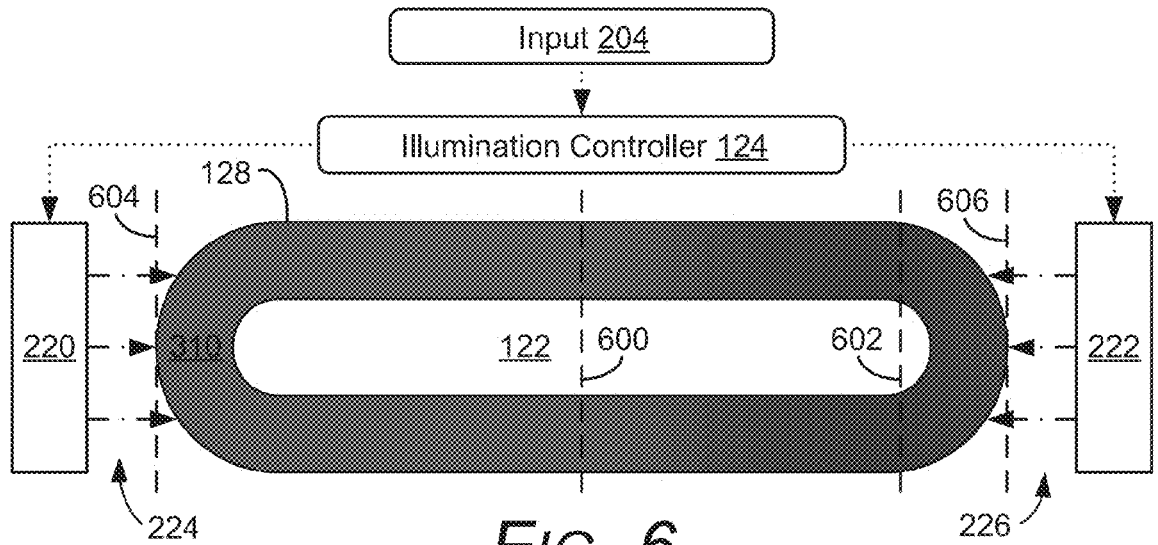
FIGS. 6-8 illustrate a light guide illuminated with various blended light emissions from illumination sources in accordance with the techniques discussed herein.
Figure 7:
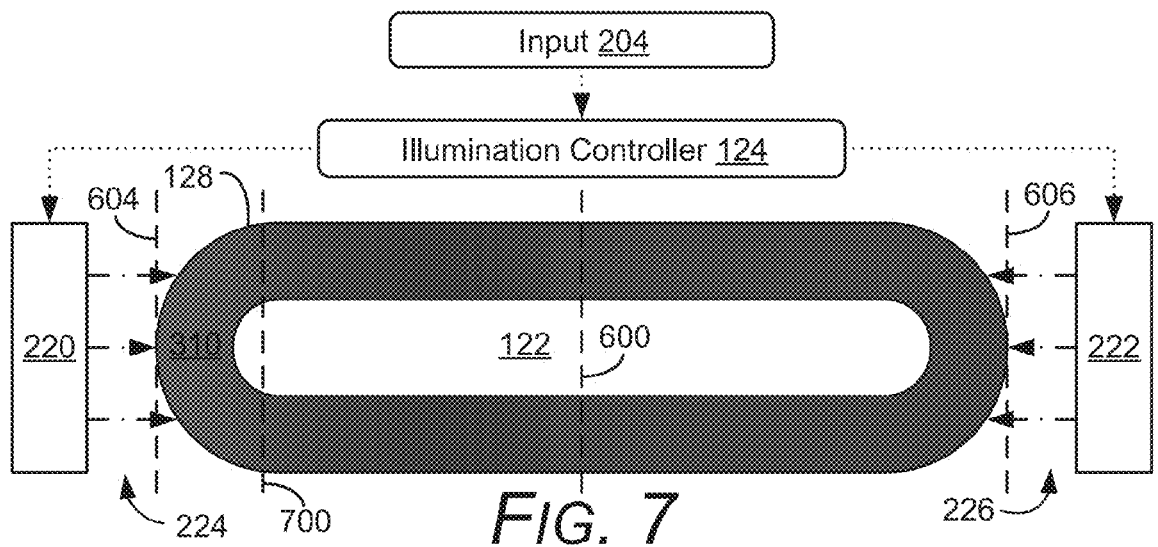
Figure 8:
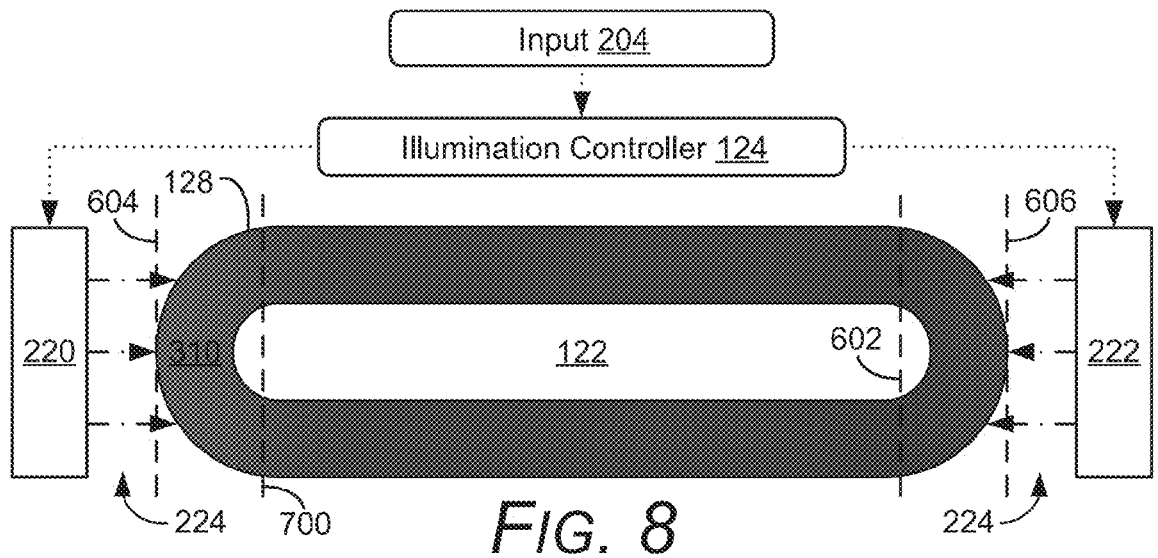

FIGS. 6-8 depict additional examples of blending of light emitted by the first illumination source 220 and the second illumination source 222 based on the input 204 provided to the illumination controller 124. In some instances, the depicted examples may be included in sequences of illumination of the light guide 128. As one example, an illumination sequence may include the illumination depicted by FIG. 6, with a transition to the illumination depicted by FIG. 7, and with a transition to the illumination depicted by FIG. 8. The sequence may occur in the order from FIG. 6 to FIG. 7 to FIG. 8, or in a different order (e.g., a reversed order). In some cases, the sequence may not include the illumination depicted by one or more of FIG. 6, FIG. 7, or FIG. 8.

Although FIGS. 6-8 may collectively illustrate the illumination sequence as described above, in some cases the illumination controller 124 may control the illumination sources to output the illumination as depicted by any of FIG. 6, FIG. 7, or FIG. 8 without transitioning between the different illuminations.

Referring to FIG. 6, light from the first illumination source 220 and the second illumination source 222 is shown blended toward the second end 316 of the light guide 128, e.g., between axis 600 and axis 602. In this configuration, the portion of the light guide 128 between axis 604 and axis 600 includes illumination output 224 from the first illumination source 220 that is not blended with the illumination output 226 from the second illumination source 222. The portion of the light guide 128 between axis 602 and axis 606 includes illumination output 226 from the second illumination source 222 that is not blended with the illumination output 224 from the first illumination source 220.

Referring to FIG. 7, light from the first illumination source 220 and the second illumination source 222 is shown blended toward the first end 314 of the light guide 128, e.g., between axis 700 and axis 600. In this configuration, the portion of the light guide 128 between axis 604 and axis 700 includes illumination output 224 from the first illumination source 220 that is not blended with the illumination output 226 from the second illumination source 222. The portion of the light guide 128 between axis 600 and axis 606 includes illumination output 226 from the second illumination source 222 that is not blended with the illumination output 224 from the first illumination source 220.

Referring to FIG. 8, light from the first illumination source 220 and the second illumination source 222 is shown blended at a center of the light guide 128, e.g., between axis 700 and axis 602. In this configuration, the portion of the light guide 128 between axis 604 and axis 700 includes illumination output 224 from the first illumination source 220 that is not blended with the illumination output 226 from the second illumination source 222. The portion of the light guide 128 between axis 602 and axis 606 includes illumination output 226 from the second illumination source 222 that is not blended with the illumination output 224 from the first illumination source 220.

Figure 9:
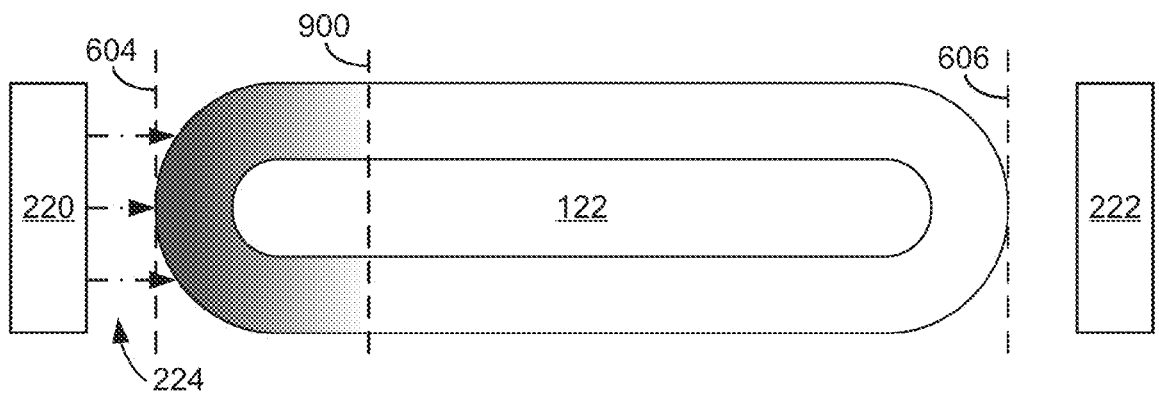
FIGS. 9-12 illustrate various stages of an example illumination sequence of a light guide in accordance with the techniques discussed herein.
Figure 10:
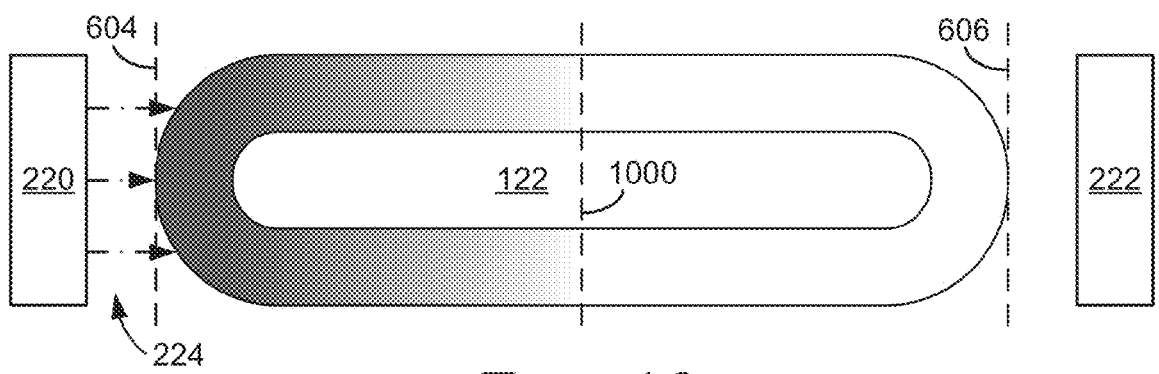
Figure 11:
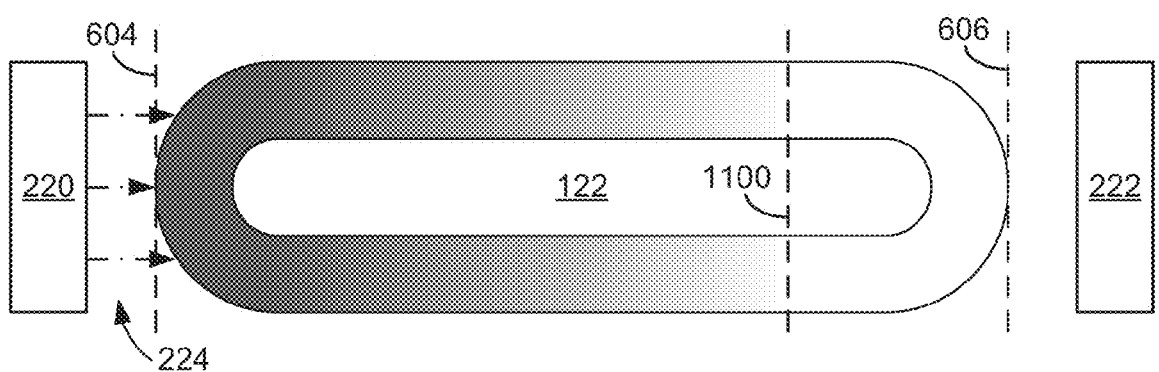
Figure 12:
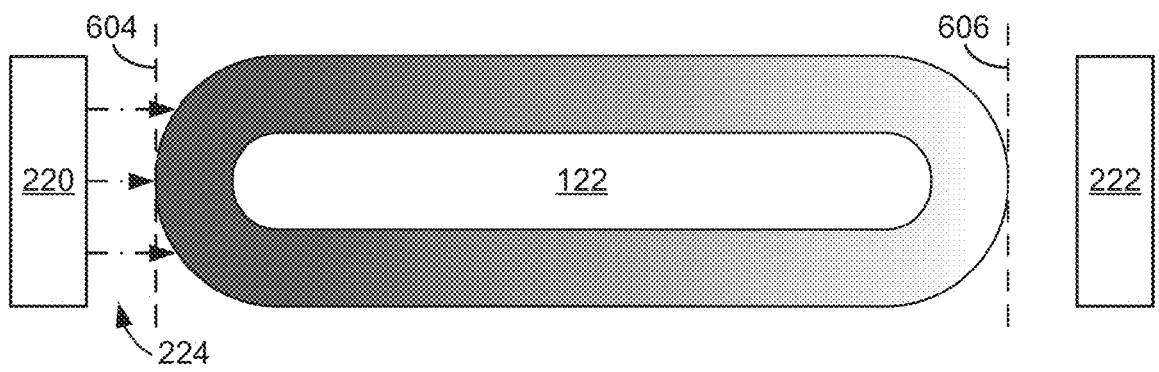

FIGS. 9-12 depict additional examples of illumination of the light guide 128 based on input 204 communicated to the illumination controller 124. In these examples, the first illumination source 220 generates illumination output 224 that spreads through the light guide 128 by various amounts. In particular, FIG. 9 shows illumination output 224 spreading through the light guide 128 by a first amount between axis 604 and axis 900, FIG. 10 shows illumination output 224 spreading through the light guide 128 by a second amount between axis 604 and axis 1000, FIG. 11 shows illumination output 224 spreading through the light guide 128 by a third amount between axis 604 and axis 1100, and FIG. 12 shows illumination output 224 spreading through the light guide 128 by a fourth amount between axis 604 and axis 606.

The illumination output 224 depicted in FIG. 9 has a first intensity and illuminates a first amount of the light guide 128. The illumination output 224 depicted by FIG. 10 has a second intensity greater than the first intensity and illuminates a second amount of the light guide 128 greater than the first amount. The illumination output 224 depicted by FIG. 11 has a third intensity greater than the second intensity and illuminates a third amount of the light guide 128 greater than the second amount. The illumination output 224 depicted by FIG. 12 has a fourth intensity greater than the third intensity and illuminates a fourth amount of the light guide 128 greater than the third amount.

Figure 13:
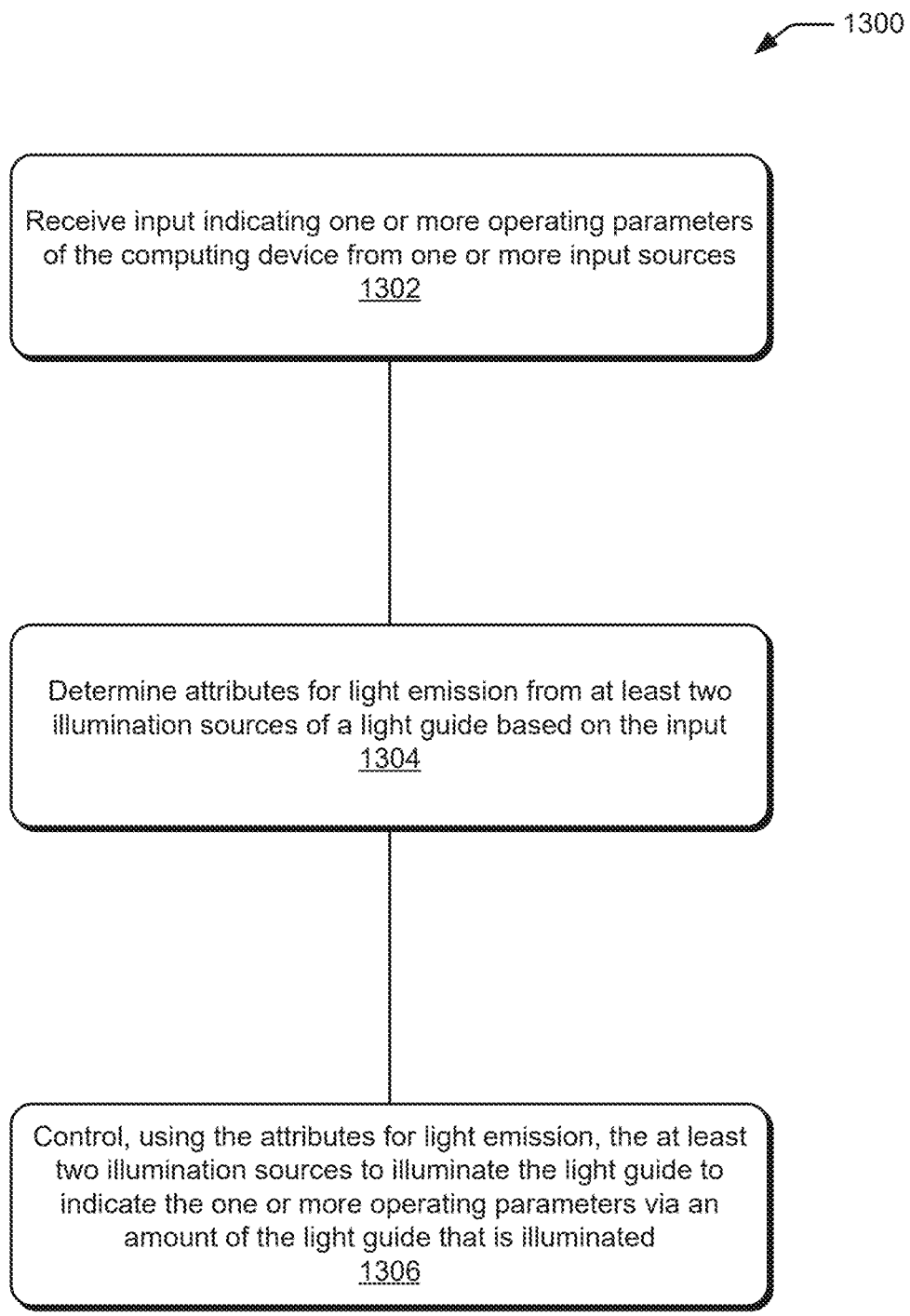
FIG. 13 illustrates an example process for implementing the techniques discussed herein in accordance with one or more embodiments.

FIG. 13 illustrates an example process 1300 for implementing the techniques discussed herein in accordance with one or more embodiments. Process 1300 is carried out by an illumination system such as illumination system 118 of FIG. 1, and can be implemented in software, firmware, hardware, or combinations thereof. Process 1300 is shown as a set of acts and is not limited to the order shown for performing the operations of the various acts.

In process 1300, input indicating one or more operating parameters of the computing device is received from one or more input sources (act 1302). By way of example, input 204 is received by the illumination controller 124 from one or more of the input sources 202 as described above.

Attributes for light emission from at least two illumination sources of a light guide are determined based on the input (act 1304). By way of example, attributes for light emission, such as light intensity and/or light color, are determined for the first illumination source 220 and the second illumination source 222 based on the input 204.

The at least two illumination sources are controlled using the attributes for light emission to illuminate the light guide to indicate the one or more operating parameters via an amount of the light guide that is illuminated (act 1306). By way of example, the first illumination source 220 and the second illumination source 222 are controlled to illuminate the light guide 128 to indicate operating parameters associated with the input sources 202 as described above. The amount of the light guide 128 that is illuminated is controlled based on the input 204 as described above, e.g., portion 500.

Figure 14:
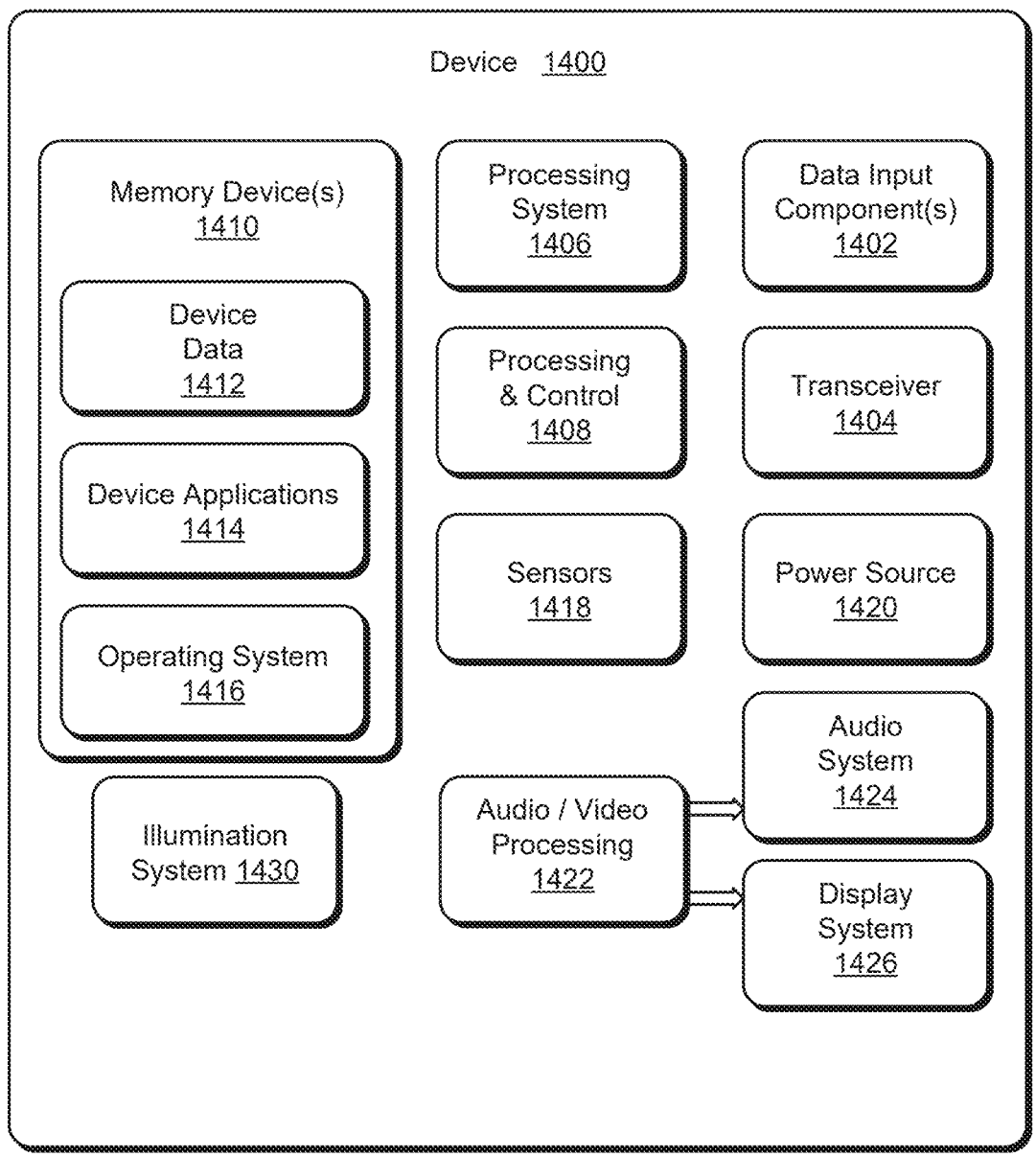
FIG. 14 illustrates various components of an example computing device that can implement embodiments of the techniques discussed herein.

FIG. 14 illustrates various components of an example computing device that can implement embodiments of the techniques discussed herein. The computing device 1400 can be implemented as any of the devices described with reference to the previous FIGURES, such as any type of client device, mobile phone, tablet, computing, communication, entertainment, gaming, media playback, or other type of computing device. In one or more embodiments the computing device 1400 implements an illumination system 1430 similar to, or the same as, the illumination system 118 described above. Although illustrated as separately from the memory devices 1410, alternately or in addition the illumination system may be included at least in part in the memory devices 1410.

The computing device 1400 includes one or more data input components 1402 via which any type of data, media content, or inputs can be received such as user-selectable inputs, messages, music, television content, recorded video content, and any other type of text, audio, video, or image data received from any content or data source. The data input components 1402 may include various data input ports such as universal serial bus ports, coaxial cable ports, and other serial or parallel connectors (including internal connectors) for flash memory, DVDs, compact discs, and the like. These data input ports may be used to couple the computing device to components, peripherals, or accessories such as keyboards, microphones, or cameras. The data input components 1402 may also include various other input components such as microphones, touch sensors, touchscreens, keyboards, and so forth.

The device 1400 includes communication transceivers 1404 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 1400 includes a processing system 1406 of one or more processors (e.g., any of microprocessors, controllers, and the like) or a processor and memory system implemented as a system-on-chip (SoC) that processes computer-executable instructions. The processing system 1406 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 1408. The device 1400 may further include any type of a system bus or other data and command transfer system that couples the various components within the device. A system bus can include any one or combination of different bus structures and architectures, as well as control and data lines.

The device 1400 also includes computer-readable storage memory devices 1410 that enable one or both of data and instruction storage thereon, such as data storage devices that can be accessed by a computing device, and that provide persistent storage of data and executable instructions (e.g., software applications, programs, functions, and the like). Examples of the computer-readable storage memory devices 1410 include volatile memory and non-volatile memory, fixed and removable media devices, and any suitable memory device or electronic data storage that maintains data for computing device access. The computer-readable storage memory (also referred to as a storage medium) can include various implementations of random access memory (RAM), read-only memory (ROM), flash memory, and other types of storage media in various memory device configurations. The device 1400 may also include a mass storage media device.

The computer-readable storage memory device 1410 provides data storage mechanisms to store the device data 1412, other types of information or data, and various device applications 1414 (e.g., software applications). For example, an operating system 1416 can be maintained as software instructions with a memory device and executed by the processing system 1406 to cause the processing system 1406 to perform various acts. The device applications 1414 may also include a device manager, such as any form of a control application, software application, signal-processing and control module, code that is native to a particular device, a hardware abstraction layer for a particular device, and so on.

The device 1400 can also include one or more device sensors 1418, such as any one or more of an ambient light sensor, a proximity sensor, a touch sensor, an infrared (IR) sensor, accelerometer, gyroscope, thermal sensor, audio sensor (e.g., microphone), and the like. The device 1400 can also include one or more power sources 1420, such as when the device 1400 is implemented as a mobile device. The power sources 1420 may include a charging or power system, and can be implemented as a flexible strip battery, a rechargeable battery, a charged super-capacitor, or any other type of active or passive power source.

The device 1400 additionally is configured to processing audio/video (AV) content. For example, the device 1400 includes an AV processing system 1422 that generates one or both of audio data for an audio system 1424 and display data for a display system 1426. In accordance with some embodiments, the AV processing system 1422 is configured to receive call audio data from the transceiver 1404 and communicate the call audio data to the audio system 1424 for playback at the device 1400. The audio system 1424 or the display system 1426 may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for a light guide with multiple illumination sources have been described in language specific to features or methods, the subject of the appended claims is not necessarily limited to the specific features or methods described. Rather, the specific features and methods are disclosed as example implementations of techniques for implementing a light guide with multiple illumination sources. Further, various different embodiments are described, and it is to be appreciated that each described embodiment can be implemented independently or in connection with one or more other described embodiments. Additional aspects of the techniques, features, and/or methods discussed herein relate to one or more of the following:

In some aspects, the techniques described herein relate to a method performed by a computing device, the method including: receiving input indicating one or more operating parameters of the computing device from one or more input sources; determining attributes for light emission from at least two illumination sources of a light guide based on the input; and controlling, using the attributes for light emission, the at least two illumination sources to illuminate the light guide to indicate the one or more operating parameters via an amount of the light guide that is illuminated.

In some aspects, the techniques described herein relate to a method, wherein each operating parameter of the one or more operating parameters is indicated by illumination of a different portion of the light guide.

In some aspects, the techniques described herein relate to a method, wherein the one or more operating parameters includes at least two different operating parameters.

In some aspects, the techniques described herein relate to a method, wherein the at least two illumination sources include a first illumination source and a second illumination source, and wherein the one or more operating parameters includes three different operating parameters, wherein a first operating parameter is indicated by illumination of the light guide by the first illumination source, a second operating parameter is indicated by illumination of the light guide by the second illumination source, and a third operating parameter is indicated by illumination of the light guide by both the first illumination source and the second illumination source.

In some aspects, the techniques described herein relate to a method, wherein the attributes for light emission include an intensity or wavelength of the light emission.

In some aspects, the techniques described herein relate to a method, further including: receiving updated operating parameters; determining updated attributes for the light emission; and adjusting, using the updated attributes, the amount of the light guide that is illuminated to indicate the updated operating parameters.

In some aspects, the techniques described herein relate to a method, wherein controlling the at least two illumination sources to illuminate the light guide includes blending light emitted by a first illumination source with light emitted by a second illumination source to indicate at least one of the one or more operating parameters.

In some aspects, the techniques described herein relate to a method, wherein the attributes include a first attribute associated with a first illumination source and a second attribute associated with a second illumination source.

In some aspects, the techniques described herein relate to a method, wherein the one or more operating parameters include at least one of a volume level of the computing device, a network connectivity of the computing device, or a current time stored by the computing device.

In some aspects, the techniques described herein relate to a method, wherein the amount of the light guide that is illuminated indicates the one or more operating parameters as a percentage of a maximum, wherein the maximum corresponds to full illumination of the light guide.

In some aspects, the techniques described herein relate to a method, wherein controlling the at least two illumination sources includes controlling two illumination sources to illuminate the light guide with blended light, the blended light including light from each of the two illumination sources and indicating an operating parameter of the one or more operating parameters that is different from each other operating parameter of the one or more operating parameters.

In some aspects, the techniques described herein relate to a method, wherein the light guide includes a light guide film configured to receive light from the at least two illumination sources and spread the received light through the light guide.

In some aspects, the techniques described herein relate to a computing device, including: a light guide; a pair of illumination sources configured to illuminate the light guide from opposite ends; at least one memory; and at least one processor coupled with the at least one memory and configured to cause the computing device to: receive input indicating operating parameters of the computing device from one or more input sources; determine attributes for light emission from the pair of illumination sources based on the input; and control the pair of illumination sources to illuminate the opposite ends of the light guide according to the attributes for light emission, with the illumination of each end of the opposite ends indicating a different respective operating parameter of the operating parameters, and with blended illumination between the opposite ends indicating another operating parameter of the operating parameters.

In some aspects, the techniques described herein relate to a computing device, wherein the attributes for light emission include a light intensity or a light color.

In some aspects, the techniques described herein relate to a computing device, wherein the operating parameters are associated with one of a volume level of the computing device, a network connectivity of the computing device, or a current time stored by the computing device.

In some aspects, the techniques described herein relate to a computing device, wherein light guide includes a light guide film configured to receive light from the two illumination sources and spread the received light through the light guide.

In some aspects, the techniques described herein relate to a system including: a light guide formed at least in part by a light guide film; a first illumination source arranged at a first end of the light guide and a second illumination source arranged at a second end of the light guide opposite to the first end, the first illumination source and the second illumination source configured to emit light through the light guide toward each other; at least one memory; and an illumination controller to: receive input indicating operating parameters of a computing device from one or more input sources; determine attributes for light emission from the first illumination source and the second illumination source based on the input; and control the first illumination source and the second illumination source to illuminate the light guide from the first end and the second end, respectively, according to the attributes for light emission, with the illumination of the first end indicating a first operating parameter of the operating parameters and the illumination of the second end indicating a second operating parameter of the operating parameters.

In some aspects, the techniques described herein relate to a system, wherein the first illumination source and the second illumination source are each configured to illuminate a center of the light guide to blend light to indicate a third operating parameter of the operating parameters.

In some aspects, the techniques described herein relate to a system, wherein the light guide is configured to blend light emitted by the first illumination source and light emitted by the second illumination source to indicate a third operating parameter of the operating parameters, and wherein the light emitted by the first illumination source has a first color, the light emitted by the second illumination source has a second color, and the blended light has a third color.

In some aspects, the techniques described herein relate to a system, wherein the illumination controller is further configured to select a portion of the light guide at which the light emitted by the first illumination source is blended with the light emitted by the second illumination source based on the input.

What is claimed is:

1. A method performed by a computing device, the method comprising:
receiving input indicating one or more operating parameters of the computing device from one or more input sources;
determining attributes for light emission from at least two illumination sources of a light guide based on the input; and
controlling, using the attributes for light emission, the at least two illumination sources to illuminate the light guide to indicate the one or more operating parameters via an amount of the light guide that is illuminated, the amount indicating the one or more operating parameters as a percentage of a maximum, the maximum corresponding to full illumination of the light guide.

2. The method of claim 1, wherein each operating parameter of the one or more operating parameters is indicated by illumination of a different portion of the light guide.

3. The method of claim 1, wherein the one or more operating parameters includes at least two different operating parameters.

4. The method of claim 1, wherein the at least two illumination sources include a first illumination source and a second illumination source, and wherein the one or more operating parameters includes three different operating parameters, wherein a first operating parameter is indicated by illumination of the light guide by the first illumination source, a second operating parameter is indicated by illumination of the light guide by the second illumination source, and a third operating parameter is indicated by illumination of the light guide by both the first illumination source and the second illumination source.

5. The method of claim 1, wherein the attributes for light emission include an intensity or wavelength of the light emission.

6. The method of claim 1, further comprising:
receiving updated operating parameters;
determining updated attributes for the light emission; and
adjusting, using the updated attributes, the amount of the light guide that is illuminated to indicate the updated operating parameters.

7. The method of claim 1, wherein controlling the at least two illumination sources to illuminate the light guide includes blending light emitted by a first illumination source with light emitted by a second illumination source to indicate at least one of the one or more operating parameters.

8. The method of claim 1, wherein the attributes include a first attribute associated with a first illumination source and a second attribute associated with a second illumination source.

9. The method of claim 1, wherein the one or more operating parameters include at least one of a volume level of the computing device, a network connectivity of the computing device, or a current time stored by the computing device.

10. The method of claim 1, wherein controlling the at least two illumination sources includes controlling two illumination sources to illuminate the light guide with blended light, the blended light comprising light from each of the two illumination sources and indicating an operating parameter of the one or more operating parameters that is different from each other operating parameter of the one or more operating parameters.

11. The method of claim 1, wherein the light guide comprises a light guide film configured to receive light from the at least two illumination sources and spread the received light through the light guide.

12. A computing device, comprising:
a light guide;
a pair of illumination sources configured to illuminate the light guide from opposite ends;
at least one memory; and
at least one processor coupled with the at least one memory and configured to cause the computing device to:
receive input indicating operating parameters of the computing device from one or more input sources;
determine attributes for light emission from the pair of illumination sources based on the input; and
control the pair of illumination sources to illuminate the opposite ends of the light guide according to the attributes for light emission, with the illumination of each end of the opposite ends indicating a different respective operating parameter of the operating parameters, and with blended illumination between the opposite ends indicating another operating parameter of the operating parameters, and with an amount of the light guide that is illuminated indicating one or more of the operating parameters as a percentage of a maximum, the maximum corresponding to full illumination of the light guide.

13. The computing device of claim 12, wherein the attributes for light emission include a light intensity or a light color.

14. The computing device of claim 12, wherein the operating parameters are associated with one of a volume level of the computing device, a network connectivity of the computing device, or a current time stored by the computing device.

15. The computing device of claim 12, wherein light guide comprises a light guide film configured to receive light from the two illumination sources and spread the received light through the light guide.

16. A system comprising:
a light guide formed at least in part by a light guide film;
a first illumination source arranged at a first end of the light guide and a second illumination source arranged at a second end of the light guide opposite to the first end, the first illumination source and the second illumination source configured to emit light through the light guide toward each other;
at least one memory; and
an illumination controller to:
receive input indicating operating parameters of a computing device from one or more input sources;
determine attributes for light emission from the first illumination source and the second illumination source based on the input; and
control the first illumination source and the second illumination source to illuminate the light guide from the first end and the second end, respectively, according to the attributes for light emission, with the illumination of the first end indicating a first operating parameter of the operating parameters and the illumination of the second end indicating a second operating parameter of the operating parameters, and with an amount of the light guide that is illuminated indicating one or more of the operating parameters as a percentage of a maximum, the maximum corresponding to full illumination of the light guide.

17. The system of claim 16, wherein the first illumination source and the second illumination source are each configured to illuminate a center of the light guide to blend light to indicate a third operating parameter of the operating parameters.

18. The system of claim 16, wherein the light guide is configured to blend light emitted by the first illumination source and light emitted by the second illumination source to indicate a third operating parameter of the operating parameters, and wherein the light emitted by the first illumination source has a first color, the light emitted by the second illumination source has a second color, and the blended light has a third color.

19. The system of claim 18, wherein the illumination controller is further configured to select a portion of the light guide at which the light emitted by the first illumination source is blended with the light emitted by the second illumination source based on the input.

20. The method of claim 1, further comprising selecting a portion of the light guide at which light emitted by the at least two illumination sources is blended based on the input.

* * * * *